United States Patent [19]

Gubler et al.

[11] Patent Number: 4,908,534

[45] Date of Patent: Mar. 13, 1990

[54] SPINDLE WITH ELECTROMOTOR DRIVE FOR A SPINNING MACHINE

[75] Inventors: Hans R. Gubler, Gebenstorf, Switzerland; Gustav Fetzer, Gingen, Fed. Rep. of Germany

[73] Assignee: Zinser Textilmaschinen GmbH, Ebersbach/Fils, Fed. Rep. of Germany

[21] Appl. No.: 257,056

[22] Filed: Oct. 13, 1988

[30] Foreign Application Priority Data

May 28, 1988 [DE] Fed. Rep. of Germany ....... 3818196

[51] Int. Cl.4 ...................... H02K 5/08; D01H 1/244; D01H 7/10
[52] U.S. Cl. ....................................... 310/45; 310/91; 310/258; 57/100
[58] Field of Search ...................... 57/100; 310/45, 91, 310/254, 217, 258, 42, 43, 89; 29/596

[56] References Cited

U.S. PATENT DOCUMENTS 1,771,475  7/1930  Wright ............................... 310/258
4,492,889  1/1985  Fukushi et al. ..................... 310/254

FOREIGN PATENT DOCUMENTS 526675   3/1954  Belgium ............................... 57/100
2950394  7/1981  Fed. Rep. of Germany ........ 57/100

Primary Examiner—Patrick R. Salce
Assistant Examiner—D. L. Rebsch
Attorney, Agent, or Firm—Shefte, Pinckney & Sawyer

[57] ABSTRACT

A stator for an electric motor for driving a spindle of a spinning machine, including a magnetic core having a stack of magnetically active plates and a plurality of coils received within the plates, projecting beyond the top and bottom surfaces of the magnetic core. A protective covering encloses the projecting portions of the coils to protect the coils from impact forces or other disturbances.

13 Claims, 2 Drawing Sheets

SPINDLE WITH ELECTROMOTOR DRIVE FOR A SPINNING MACHINE

BACKGROUND OF THE INVENTION

The present invention relates to an electric motor drive for a spindle of a spinning machine which is mountable on the spindle bank of the spinning machine. More particularly, the present invention relates to an electric motor for a spindle having a fixed stator and a rotor mounted on the spindle.

One type of spinning machine includes a plurality of spindles individually driven by electric motors. A spindle with a rotor mounted thereon can be removed from its position within the electric motor and a new spindle with a rotor thereon inserted in its place. However, damage to the coils of the stator of the elctric motor can occur if the newly inserted spindle is carelessly or roughtly inserted. Additionally, the coils of the stator typically porject beyond the top and bottom surfaces of the magnetic core and are especially subject to damage in these projecting portions from impact forces or other disturbances.

Accordingly, the need exists for protection for the coils of the stator of the electric motor for driving a spindle so that the coils are not damaged during insertion or withdrawal of the spindle or from impact forces or other disturbances on the outside of the stator.

SUMMARY OF THE INVENTION

The present invention provides an apparatus for protecting the coils of the stator from damage during insertion or withdrawal of the spindle or from impact forces or other distrubances. The apparatus includes impact resistant material which advantageously enhances the capability of the stator to dissipate heat from the coils of the stator.

The present invention provides a spindle drive apparatus for a spinning machine of the type having a spindle rotatably mounted in a bearing housing in the spindle bank of the spinning machine and on which spindle bobbins are disposed with a rotor fixedly mounted thereof for rotation therewith, the apparatus including a stator, mounted on the spindle bank and surrounding the rotor, for rotating the rotor and the spindle, the stator including a plurality of electrically conductive coils and a stack of magnetically drive plates shaped for receiving a plurality of coils with the coils having portions projecting from the stack of plates, and a protective cover enclosing the projecting portions of the coils. In one modification of the apparatus of the present invention, the apparatus includes a plurality of brackets for retaining the stack of plates in stacked relationship with one another and an interconnecting member fixedly secured to the spindle bank and the brackets.

Preferably, the protective cover includes a cap secured to the brackets and a pair of peripheral walls, one of the pair of peripheral walls extending between the cap and the stack of plates and the other of the pair of peripheral walls extending from the stack of plates to the interconnecting member. Preferably, the protective cover includes a space-filling mass for substantially filling the space between the brackets, the cap, the stack of plates and th peripheral walls.

In another embodiment of the apparatus of the present invention, the protective cover includes a body cast onto the stack of plates and the coils.

DETAILED DESCRIPTION OF PREFERRED EMBODIMENTS

Figure 1:
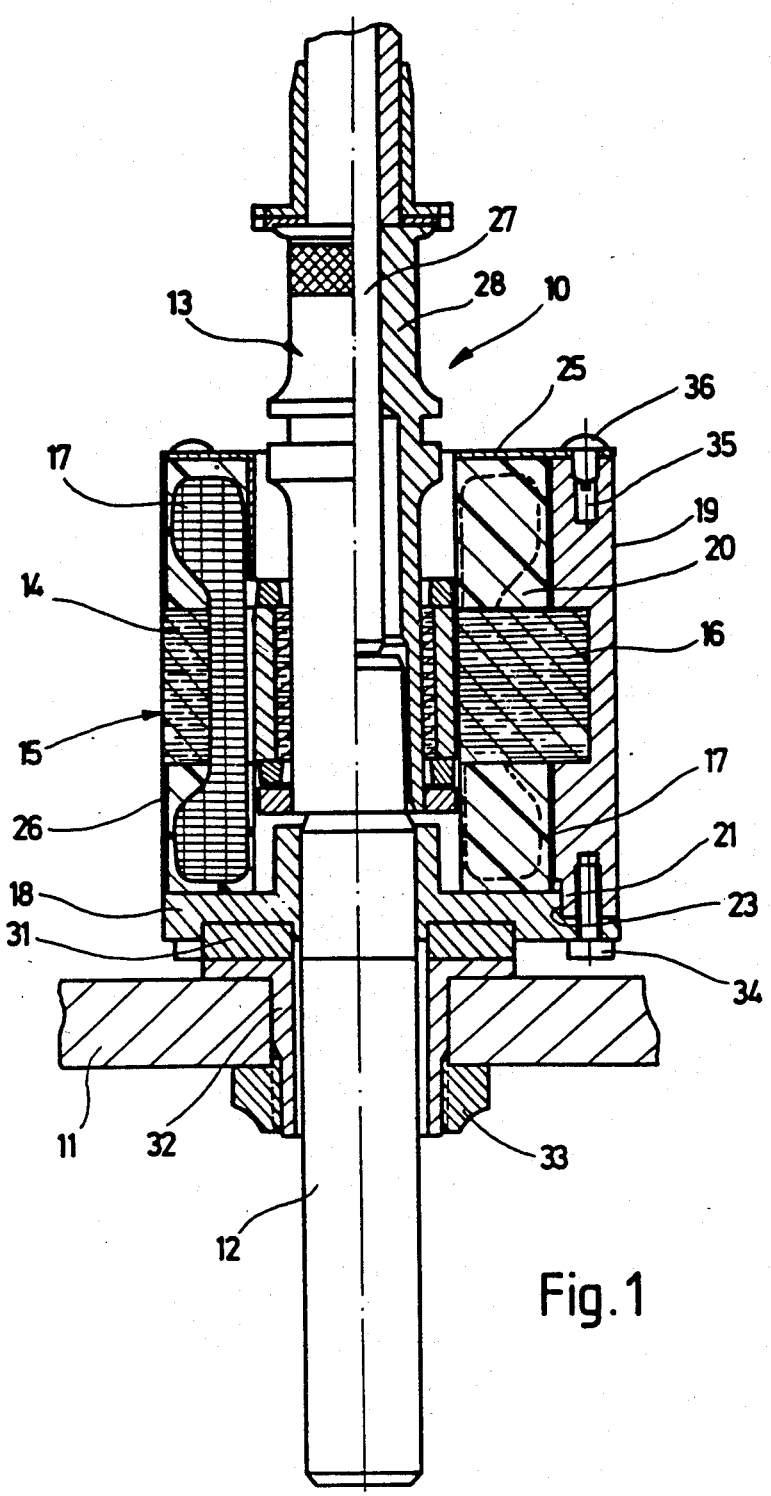
FIG. 1 is a front elevation, partially in section, of a spinning station of a spinning machine showing one preferred embodiment of the stator of the present invention.

In FIG. 1, a spinning station 10 of a ring spinning machine is illustrated and includes one preferred embodiment of a stator 15 of the present invention having a magnetic core 16. The magnetic core 16 includes stacked plats, each of the individual plates being magnetically active and having a generally square configuration. The stator 15 cooperates with a rotor 14 which is coaxial with, and fixedly mounted to, a spindle 13. The spindle 13 is rotatably supported on a bearing housing 12 which is mounted in a spindle bank 11 of the spinning machine. By way of explanation, FIG. 1 shows the right-hand longitudinal portion of the spindle 13 in vertical cross-section and shows the left and right-hand portions of the stator 15 and the rotor 14 in vertical cross-section along a pair of planes intersecting at an angle of 1135°.

The spindle 13 includes an inner axial portion 27 which is rotatably mounted on the bearng housing 12 and an outer axial portion 28 which is coaxial with and mounted to, the inner axial portion 27 and has a bore in its lower axial end for receiving an upper axial portion of the bearing housing 12. The rotor 14 is fixedly mounted to the outer axial portion 28. The spindle 13 is adapted to receive a bobbin thereon for rotation therewith to spin yarn onto the bobbin.

The stator 15 is of conventional construction and includes, in addition to the magnetic core 16, a cage having a plurality of rods and short circuiting rings. The rotor 14 is movably disposed within the center of the stator 15 and is of lesser diameter than the inside diameter of the stator 15 so that an annular air space is present therebetween.

The magnetic core 16 of the stator 15 includes a plurality of recesses each with one of a plurality of coils 17 disposed therein. The coils 17 each include a pair of projecting portions, each of which project beyond a respective top or bottom surface of the magnetic core 16. The stator 15 is fixedly mounted relative to the bearing housing 12 by being mounted on an interconnecting member 18 which interconnects the stator 15 to an elastomeric intermediate member 31 which is mounted on a sleeve 32. The sleeve 32 is disposed in a bore in the spindle bank 11 and is secured thereto by a nut 33 threaded on one end of the sleeve. The interconnecting member 18 is fixedly mounted to the bearing housing 12 by a collar.

As seen in FIG. 1, the corners of the individual plates of the magnetic core 16 are provided for mounting a plurality of brackets 19 thereto. The brackets 19 are molded on each respective corner of the magnetic core 16 and have length such that their ends project axially further than the ends of the coils 17. Preferably, the brackets 19 are molded out of die cast aluminum and the lower axial ends of the brackets are provided with a step-like profile 21 having a curved inner surface for mounting. The profiles of the brackets 19 are held against a compatibly configured circumferential surface of a cylindrical portion 23 on the interconnecting member 18 whereby the brackets 19 and the stator 15 are centered with respect to the bearing housing 12. The brackets 19 are fixedly mounted to the interconnecting member 18 by bolts 34 inserted therethrough and threaded into the brackets 19. The outer side surfaces of the magnetic core 16 are uncovered except in the corner regions where they are covered by the brackets 19. Preferably, the brackets 19 are compatibly configured with the magnetic core 16 so that the entire assembly has a generally square configuration.

The upper axial ends of the brackets 19 are each provided with a bore 35 for receiving a rivet 36 inserted through a corresponding bore in a cap 25. The cap 25 includes an axially extending sleeve coaxial with the bearing housing 12 and the spindle 13, and having an inner diameter slightly less than the inner diameter of the magnetic core 16 to form a protective covering over the coil projection above the core 16. The cap 25 also includes an axially extending outer sleeve having an inner diameter greater than the radial extent of the coils 17 measured across the stator 15 and extending to the top surface of the magnetic core 16.

The stator 15 also includes a peripheral wall 26 extending axially from the interconnecting member 18 to the bottom surface of the magnetic core 16. The wall has a diameter greater than the radial extent of the coils 17 measured across the stator 15. The spaces between the bottom surface of the magnetic core 16, the interconnecting member 18 and the peripheral wall 26 and between the magnetic core 16 and the cap 25 are filled with a space filling mass such as, for example, an impact resistant plastic material 20 which protects the projecting portions of the coils 17.

Preferably, the impact resistant plastic material 20 includes embedded particles or other material which enhance the heat dissipating capability of the material. The stator 15 of the present invention advantageously provides better heat dissipation around the coils than can be achieved in a stator having coil projecting portions exposed to the open air.

Figure 2:
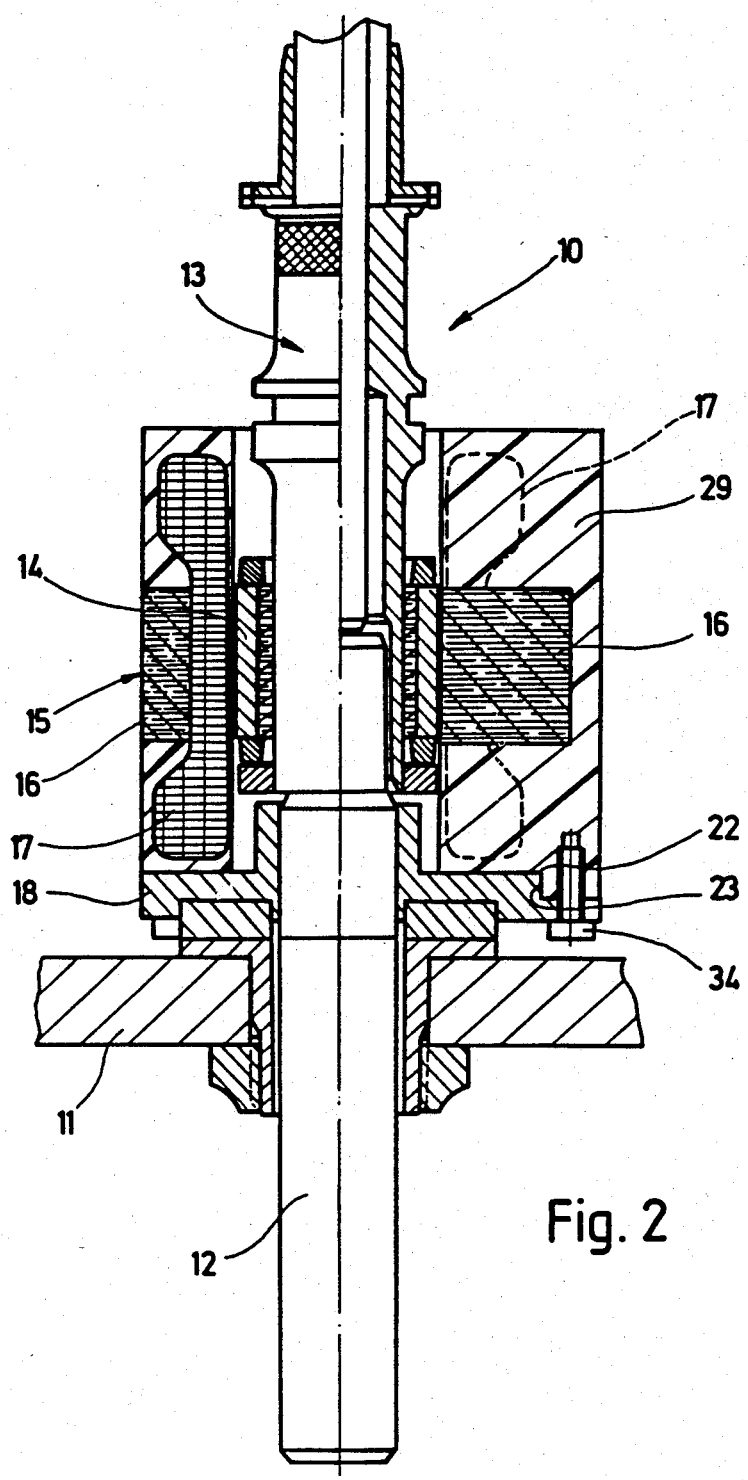
FIG. 2 is a front elevation, partially in section, of another embodiment of the stator of the present invention.

In FIG. 2, another preferred embodiment of the present invention is illustrated and includes a stator 15 having a magnetic core 16 of generally square configuration. The magnetic core 16 has a plurality of bores in which a plurality of coils 17 are received. Each coil 17 has a portion extending axially beyond the top and bottom surface of the magnetic core 16. The projecting portions of the coils 17 are surrounded by a body 29 which is cast onto the magnetic core 16 and the coils 17 preferably composed of an impact resistant plastic material 20. Preferably, the body 29 is composed of plastic reinforced with fibers and, especially, carbon fibers. Also, the material of the body 29 preferably includes particles which enhance the heat dissipating capability of the material.

The body 29 is provided on its bottom surface with an annular lip 22 having an inwardly facing arcuate surface which is mounted against the circumferential surface of a compatibly configured cylindrical portion 23 on the interconnecting member 18 and which thereby serves to center the stator 15 on the interconnecting member 18. The body 29 is secured to the interconnecting member 18 by a plurality of bolts 34.

The magnetic core 16, the coils 17 and the body 29 comprise a single assembly unit having a generally cubical configuration. The body 29 extends axially only along the corner regions of the plates of the magnetic core 16 so that the outer side surfaces of the magnetic core 16 between the corner regions of the plates are uncovered. The body 29 advantageously protects the coils 17 and enhances the heat dissipation therefrom.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A spindle drive apparatus for a spinning machine of the type having a bobbin supporting spindle rotatably mounted in a bearing housing in the spindle bank of the spinning machine and on which spindle a rotor is fixedly mounted for rotation therewith, said apparatus comprising:

a stator, mounted on the spindle bank and surrounding the rotor, for rotating the rotor and the spindle, said stator including a plurality of electrically conductive coils and a stack of magnetically active plates shaped for receiving said plurality of coils;

an interconnecting member, connected to the spindle bank on one axial end of said stator, for mounting said stator on the spindle bank, said coils having a first portion projecting from said stack of plates in a direction toward said interconnecting member and a second portion projecting from said stack of plates in a direction away from said interconnecting member;

a protective cover encasing said first and second projecting portions of said coils, said protective cover including a first protective cover portion extending from said stack of plates in said direction towards said interconnecting member for substantially encasing said first projecting portion of said coils and a second protective cover portion extending from said stack of plates in said direction away from said interconnecting member for substantially encasing said second projecting portion of said coils; and means for securing said second protective cover portion to said interconnecting member including a plurality of brackets, one end of each bracket being fixedly connected to said interconnecting member and the other end of each bracket being fixedly connected to said second protective cover portion.

2. A spindle drive apparatus according to claim 1 and characterized further by a plurality of brackets for retaining said stack of plates in relationship with one another, and an interconnecting member fixedly secured to the spindle bank of the spinning machine and to said brackets.

3. A spindle drive apparatus according to claim 2 and characterized further in that each of said brackets includes arcuate recesses and said interconnecting member includes a cylindrical surface, said cylindrical surface and said recesses interengaging to center said brackets and stator with respect to the bearing housing.

4. A spindle drive apparatus according to claim 3 and characterized further in that said protective cover includes a cap secured to said brackets and a pair of peripheral walls, one of said pair of peripheral walls extending between said cap and said stack of plates and the other of said pair of peripheral walls extending from said stack of paltes to said interconnecting member.

5. A spindle drive apparatus according to claim 4 and characterized further in that said protective cover includes a space-filling mass for substantially filling the space between said brackets, said cap, said stack of plates and said peripheral walls.

6. A spindle drive apparatus according to claim 2 and characterized further in that each of said plates is of a generally square shape, the corner regions of said plates being aligned, and said brackets are secured to said plates along their corner regions.

7. A spindle drive apparatus according to claim 2 and characterized further in that the outer side surfaces of said stack of plates are uncovered between said brackets.

8. A spindle drive apparatus according to claim 1 and characterized further in that said protective cover includes a body cast onto said stack of plates and said coils.

9. A spindle drive apparatus according to claim 2 and characterized further in that said protective covering is a body cast onto said stack of plates and said coils, and said body is fixedly secured to said interconnecting means.

10. A spindle drive apparatus according to claim 8 and characterized further in that the outer side surfaces of said stack of plates are uncovered.

11. A spindle drive apparatus according to claim 5 and characterized further in that said space-filling mass is formed of plastic material.

12. A spindle drive apparatus according to claim 11 and characterized further in that said space-filling mass includes particles of heat dissipating material.

13. A spindle drive apparatus according to claims 11 and characterized further in that said plastic is fiber reinforced.

* * * * *

UNITED STATES PATENT AND TRADEMARK OFFICE
CERTIFICATE OF CORRECTION

PATENT NO. : 4,908,534

DATED : March 13, 1990

INVENTOR(S) : Hans Rudolf Gubler et al

It is certified that error appears in the above-identified patent and that said Letters Patent is hereby corrected as shown below:

On the title page item [73], the Assignee should read:

--Zinser Textilmaschinen GmbH, Fed. Rep. of Germany and Asea Brown Boveri AG, Baden, Switzerland--

Signed and Sealed this

First Day of December, 1992

*Attest:*

DOUGLAS B. COMER

*Attesting Officer*     *Acting Commissioner of Patents and Trademarks*